United States Patent [19]

Norton et al.

[11] Patent Number: 4,602,499

[45] Date of Patent: Jul. 29, 1986

[54] FLEXIBLE INDUSTRIAL SYSTEM WITH QUICK CHANGE PART HOLDING MEANS

[75] Inventors: Charles J. Norton, Plymouth; Andrew F. Schrom, Detroit, both of Mich.

[73] Assignee: Scans Associates, Inc., Livonia, Mich.

[21] Appl. No.: 688,990

[22] Filed: Dec. 24, 1984

[51] Int. Cl.⁴ ............................................. G01M 3/26
[52] U.S. Cl. .......................................... 73/41; 73/116; 198/502.1
[58] Field of Search ......................... 73/41, 116, 117.3; 198/345, 472, 502

[56] References Cited

U.S. PATENT DOCUMENTS

| | | | |
|---|---|---|---|
| 2,884,113 | 4/1959 | Converse, III et al. | 73/116 |
| 3,538,759 | 11/1970 | Schrom | 73/116 |
| 3,648,819 | 3/1972 | Converse, III et al. | 198/463 |
| 3,695,099 | 10/1972 | Viano | 73/117.3 |
| 4,010,840 | 3/1977 | Eberle | 198/502 |
| 4,014,428 | 3/1977 | Ossbahr | 198/345 |
| 4,047,622 | 9/1977 | Blessing | 198/472 |
| 4,209,088 | 6/1980 | Siarto | 198/345 |
| 4,285,233 | 8/1981 | Swis | 198/502 |
| 4,402,393 | 9/1983 | Kent | 198/648 |
| 4,480,738 | 11/1984 | Mattson | 198/472 |
| 4,492,301 | 1/1985 | Inaba et al. | 198/648 |

Primary Examiner—Stewart J. Levy
Assistant Examiner—Hezron E. Williams
Attorney, Agent, or Firm—Gifford, Groh, Van Ophem, Sheridan, Sprinkle & Dolgorukov

[57] ABSTRACT

The present invention relates to industrial systems, and more particularly to a flexible industrial system with quick change part holding means which can be used to perform many different operations on a wide variety of parts. The embodiment disclosed shows such a flexible industrial system adapted to test many different types of parts using a single piece of test equipment by virtue of having a series of identical pallets for each type of part to be tested which can be quickly on-loaded and of-floaded from a means of providing movement between a plurality of stations, such as a rotary index table. By providing that each in a series of part holding means has means to connect the part holding means to the means of providing movement between stations, means to perform desired operations on parts on the part holding means, and means to quickly connect to said means to perform desired operations, a tremendously flexible test system is provided.

18 Claims, 12 Drawing Figures

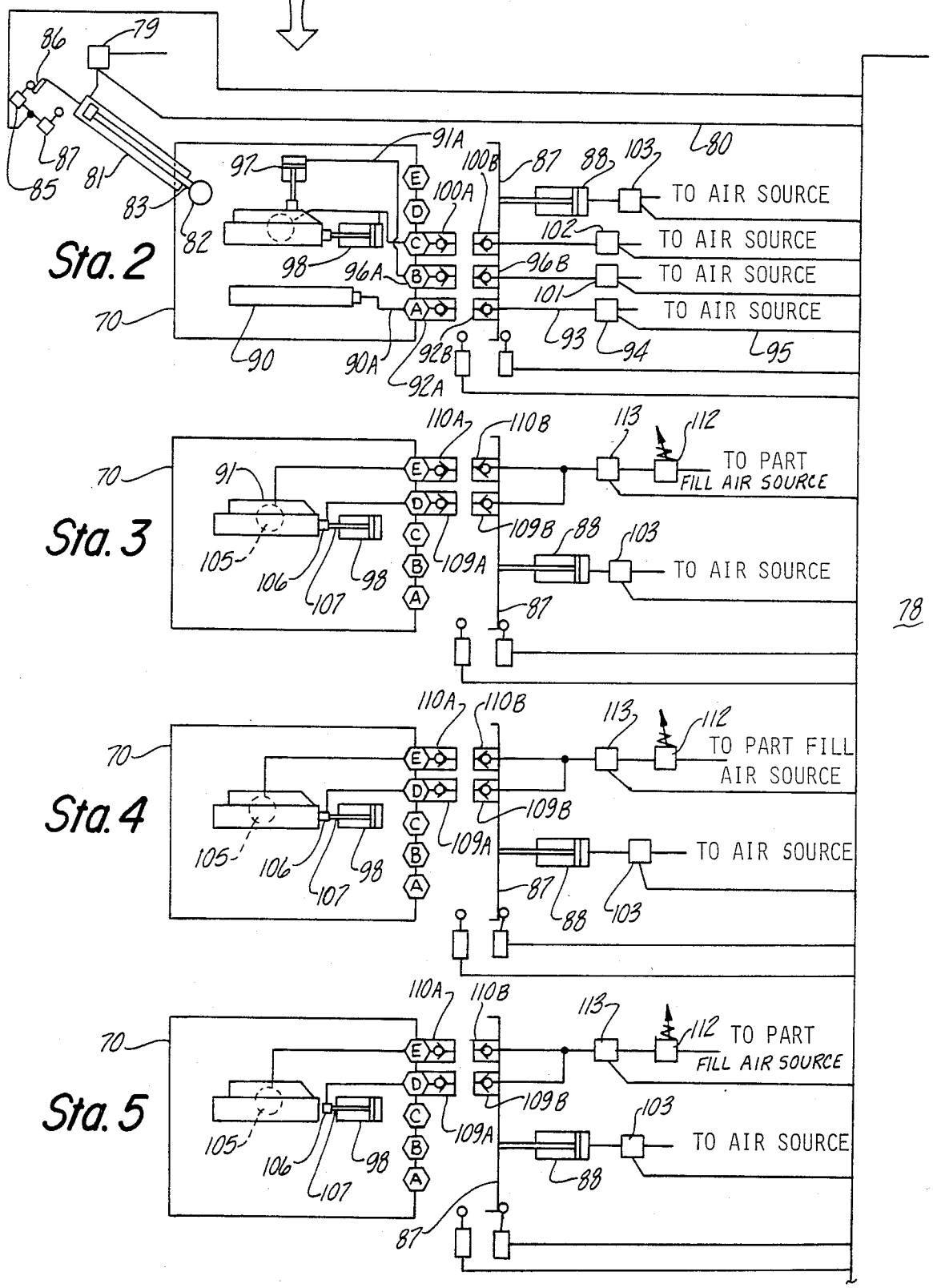

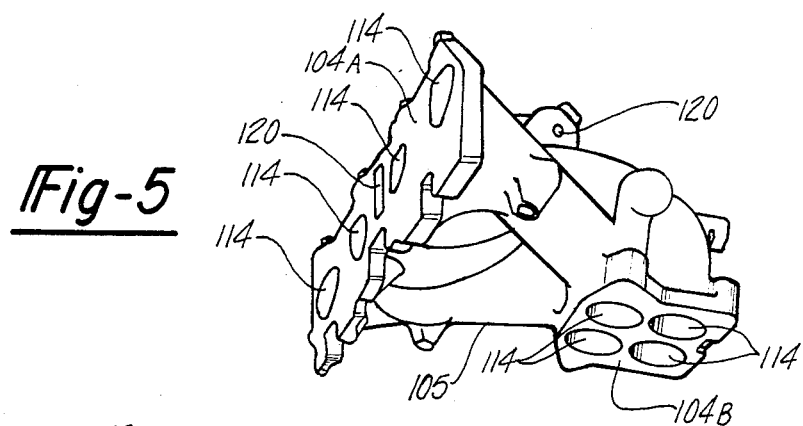
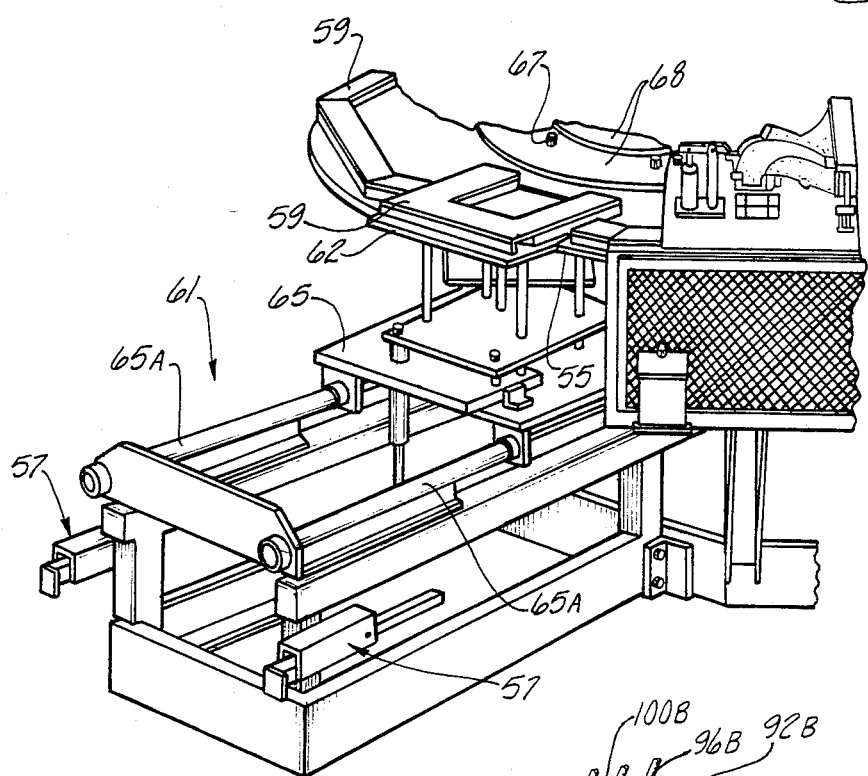
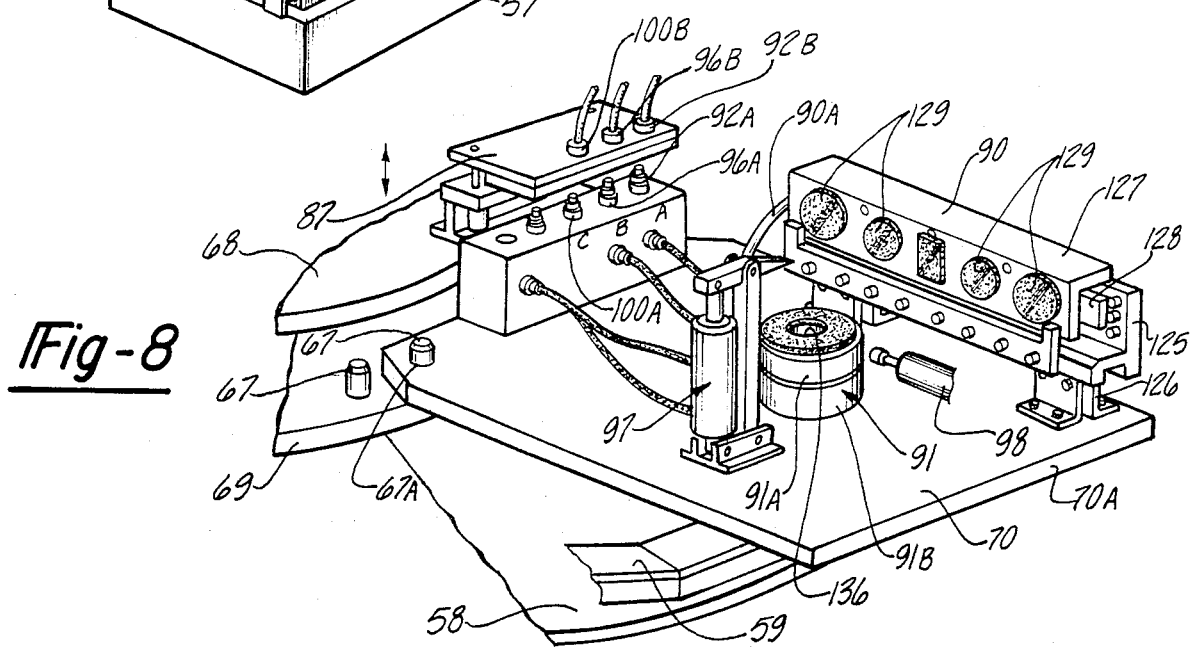

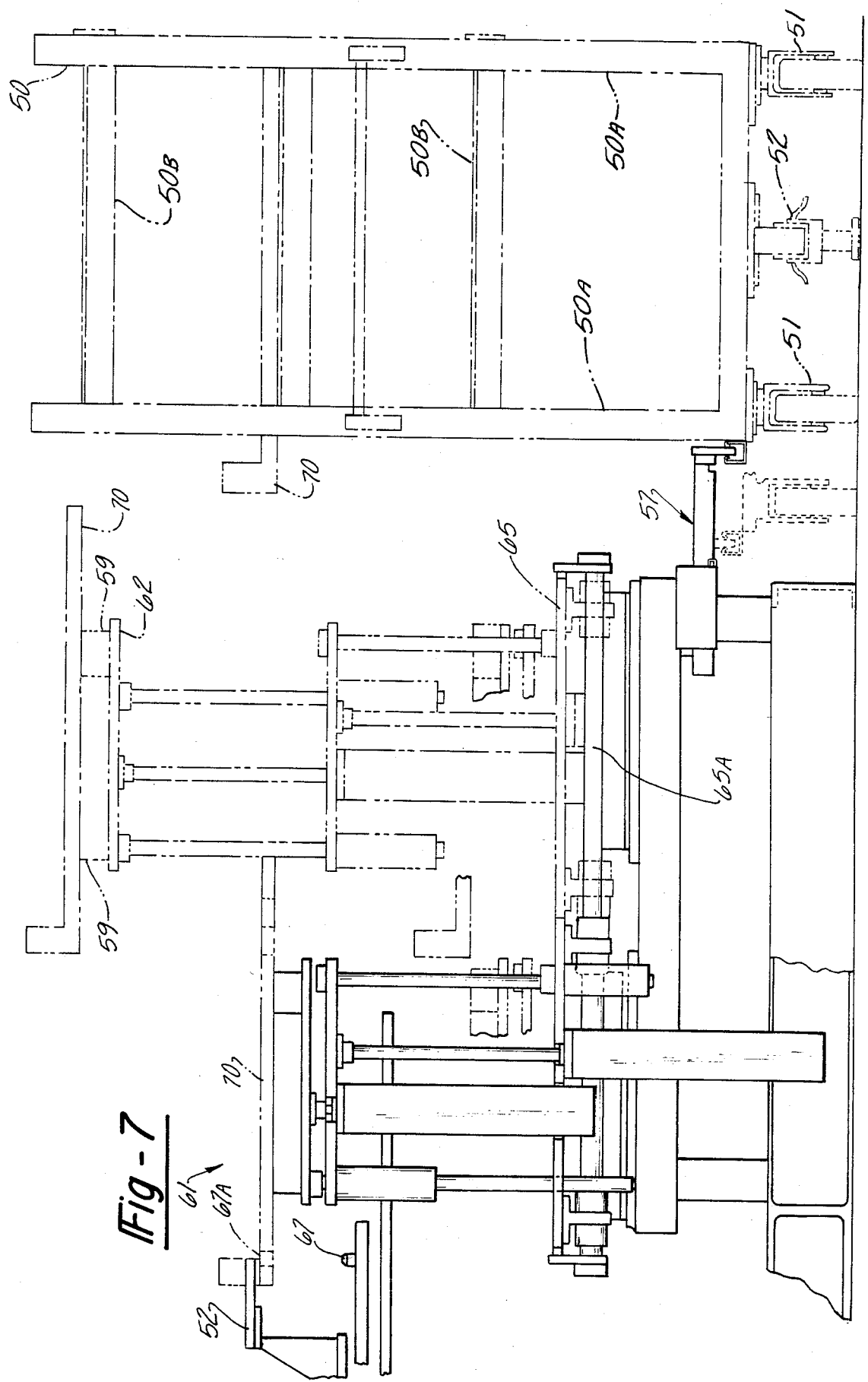

FLEXIBLE INDUSTRIAL SYSTEM WITH QUICK CHANGE PART HOLDING MEANS

BACKGROUND OF THE INVENTION

1. Field of the Invention

The present invention relates to industrial systems, and more particularly to a flexible industrial system with quick change part holding means which can be used to perform many different operations on a wide variety of parts. The embodiment disclosed shows such a flexible industrial system adapted to test many different types of parts using a single piece of test equipment by virtue of having a series of identical pallets for each type of part to be tested which can be quickly on-loaded and offloaded from a means of providing movement between a plurality of stations, such as a rotary index table.

By providing that each in a series of part holding means has means to connect the part holding means to the means of providing movement between stations, means to perform desired operations on parts on the part holding means, and means to quickly connect to said means to perform desired operations, a tremendously flexible test system is provided. An air leak test is an example of one of the many types of tests or operations which may take place in such test system.

2. Description of the Prior Art

The prior art testing systems of which Applicants are aware are either of the conveyor type or rotary type. The conveyor type has a positive or nonpositive conveyor, with a series of dedicated test stands spaced around the conveyor. Each of the test stations can only perform a predetermined fixed operation or sequence of operations, and thus can only test one type of part.

An example of such a conveyor-type test system is disclosed in U.S. Pat. No. 3,648,819 issued to V. G. Converse, III et al. and owned by Applicants' assignee. In operation, the nonpositive conveyor has a series of identical pallets and test parts, and would move them on or off the conveyor to the test stands as needed, depending on a series of mechanical flags.

If, for example, three different types of engines were to be run on a line, three different types of stands may be needed, and if a particular type of engine was not on the line at one time, the stands dedicated to testing that type of part would stand idle. In addition, switching between different types of test parts could not be made because the stand could not accomodate this. For example, a switch from engines to transmissions could not be made. Thus, this test system, although testing engines much faster than previous test stands were able to, and representing a great advance in the art at the time, still left serious problems in the testing art because of the dedicated nature of the test stands.

The advent of the rotary-type testing system, as evidenced by the U.S. Pat. No. 4,285,233 assigned to the Sun Electric Company, did little to alleviate this problem because although it used a rotary index table to conserve space, it still required dedicated test stands, and could only test one type of product at a time, thus having virtually no flexibility whatsoever.

In addition, both the continuous conveyor type, and the rotary index type of test system, because of the fact that they had dedicated test stands and required an entire test, whether a leak test or other type of test, to be conducted in a single stand, required a much greater test time. For example, in a leak test, which requires a fill time, a balance time and then a test time, the total test time for each station was the total of these three times, rather than just the actual test time and, as will be shown, this greatly reduced production rates of these type of stands and greatly increased costs, thus, leaving serious problems in the art for one who had a wide variety of parts to test, and needed flexibility in a test stand, and at the same time needed high production rates.

Applicant's assignee was instrumental in solving some of the problems of the rotary index table type of test system when it produced a twelve station halogen leak test machine in which a part was clamped and sealed in a test chamber, the chamber was evacuated, and the part was pressurized, and a test of the atmosphere of the test chamber was made to find if any gas leaked through the walls of the test part into the chamber.

In this machine, the pressurization, which could correspond to the balance time in a leak test system, took place over two stations. However, even this test machine left serious problems in the art because the fixturing was dedicated to the testing of one single part and, although it could be serviced off-line if a defect developed, one fixture was certainly not interchangeable with another for testing a multitude of types of test parts rapidly and easily as can be done by the present invention. Thus, even this leak testing machine did not produce the flexibility of the present invention.

SUMMARY OF THE INVENTION

A flexible industrial system having great flexibility by virtue of having nondedicated stations and quick change part holding means is provided. For each type of part to be tested there is a series of identical part holding means, such as pallets, to which the part is clamped and certain connections to the cavities in the part to be operated on are made by way of quick disconnects.

In the application of the disclosed industrial system to a leak testing operation, each pallet for a particular part will have a series of male connectors placed in the same location. As the test part and its associated pallet move through a series of test stations on a rotary index table, different ones of the male connectors are entered by female connectors in the test station depending on the particlar operation to take place. Thus, a wide variety of parts may be tested simply by having a number of pallets on hand for each type of part which may be coming off the production line, and offloading one style of pallet and on-loading another style of pallet when it is desired to change the part being tested. Thus, a great variety of parts of the same general nature, such as manifolds, may be tested and, in addition, different types of parts may be interchanged, such as manifolds, transmission cases, etc., because it is the part holding means that is interchangeable in the present invention.

Further, the present invention is particularly adopted to perform a leak test wherein the production rate of the system is equal to the cycle time of the part holding transfer means, and not the fill time, plus the balance time, plus the leak test time, as in prior art systems.

Thus, it is an object of the present invention to provide an improved flexible industrial system having quick change part holding means such as pallets.

A further object of the present invention is to provide a system of the foregoing nature whereby the apparatus necessary to perform certain desired operations on a part is found on each part holding means, and means to conect to such apparatus are supplied through a series of standardized connectors.

A further object of the present invention is to provide a test system of the foregoing nature which either may be laid out in a linear manner, or utilize a rotary index table arrangement.

A still further object of the present invention is to provide a leak testing system that can test a multi-chamber part.

A further object of the present invention is to provide a flexible testing system wherein defective clamping or sealing mechanisms may be serviced off-line, since these are all on the pallet.

A still further object of the present invention is to provide a flexible testing system wherein different length pallets may be provided for different types of parts without affecting the operation of the system.

A further object of the present invention is to provide a leak testing system using a timed fill.

A further object of the present invention is to provide a leak testing system wherein the fill and balance times are taking place while other parts in the system are being tested for leaks.

A further object of the present invention is to provide a flexible testing system having fixed tooling with quick change pallets.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 3 is a diagrammatic view showing in greater detail stations one through five of the test system shown in FIG. 1.

FIG. 5 is a perspective view of an engine manifold, and is representative of one of the types of parts which may be tested utilizing the construction of the present invention.

FIG. 6 is a partial perspective view showing a portion of the apparatus used to quickly change from one series of pallets to another.

FIG. 7 is an elevational view showing additional features of the quick pallet change apparatus.

FIG. 8 is a partial perspective view showing an empty pallet ready to be loaded with a test part.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description and not of limitation.

DESCRIPTION OF THE PREFERRED EMBODIMENT

Figure 1:
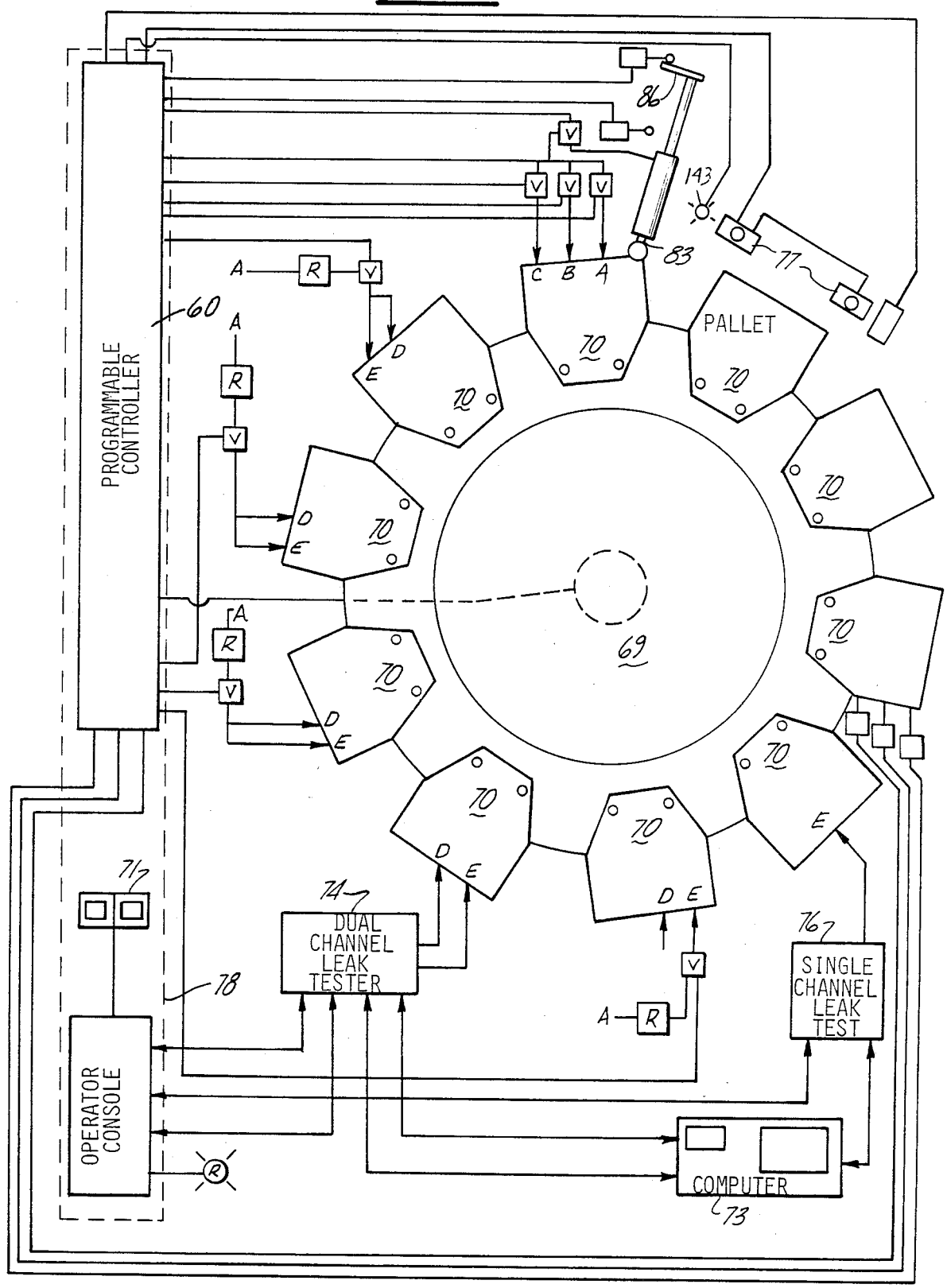
FIG. 1 is a diagrammatic view of a flexible industrial system having quick change part holding means being utilized as a leak testing apparatus and embodying the construction of the present invention.
Figure 2:
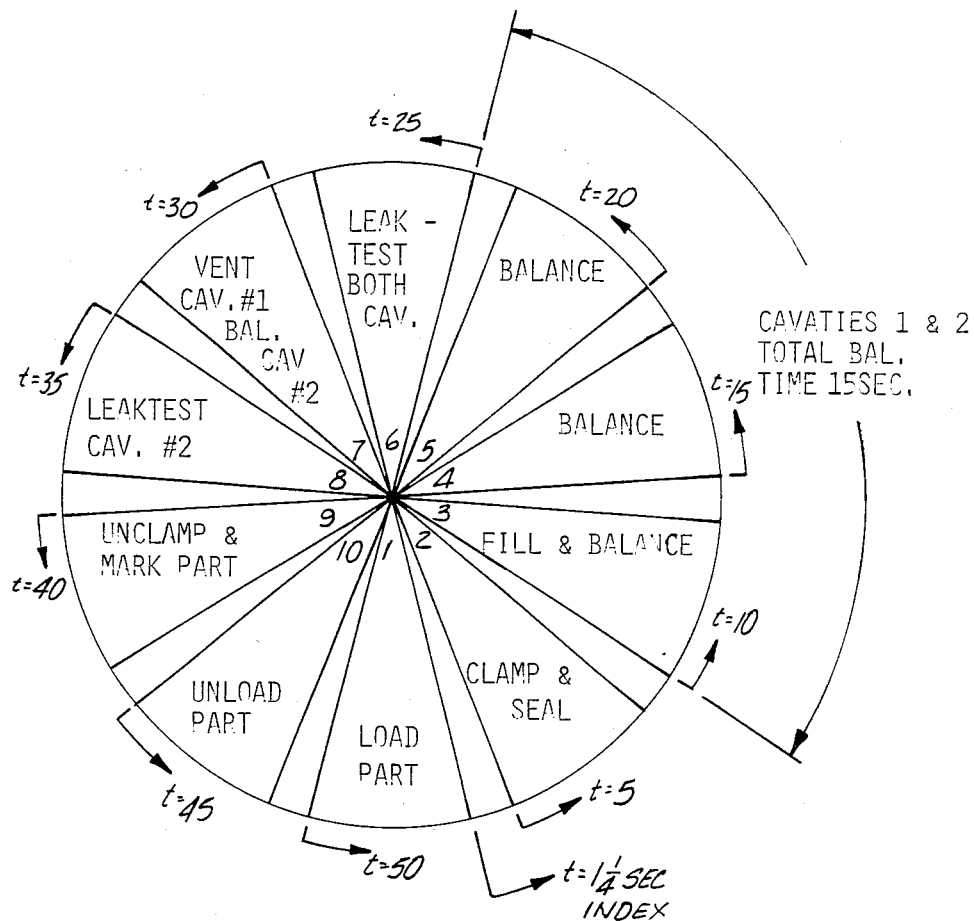
FIG. 2 is a chart showing the sequence of operations of our improved testing system.

Referring to FIGS. 1 and 2, there is shown a diagrammatic view of a ten station system utilizing the construction of the present invention. In the present example, a leak testing system is shown, but it should be understood that due to the unique combination of elements which is to be described, it is easily within the skill of the art to utilize the present construction for manufacturing, assembly, gauging and/or other operations.

FIG. 2 shows a chart with numbers thereon corresponding to the operations which take place in the like numbered test stations shown in FIG. 1. In the example shown, the total test cycle takes fifty seconds, with one part being produced every five seconds. Of the five-second cycle time, one and one-quarter seconds are used to index table, and three and three-quarter seconds are utilized for the various operations shown.

In station one the part is loaded. In station two it is determined whether or not a part is present, and if it is the part is clamped and sealed in place. In station three an initial fill and balance takes place. In station four, if a large part is being tested, and it could not be filled completely in station three, an additional fill takes place before the balance time starts. However, if a small or moderate size part is being tested, which was completely filled in station three, it is possible some balancing took place in station three, and station four would be an additional balance time after any loss in pressure is compensated for in a manner to be described hereinafter.

Station five, again, is mainly a balance station, but if any air is lost during the balance time utilized in station four, an additional topping off will take place to a predetermined pressure, and the remainder of the time will be a balance time.

In station six, both cavities of the part to be tested, in this case the part shown in FIG. 5, have been pressurized and balanced in stations three through five. By use of a dual-channel leak test means, which may be such as the Uson Series 100 Multiple Limits Memory Tester, manufactured by the Uson Corporation of Houston, Tex., leaks of both cavities to atmosphere are tested. It should be understood, however, that even though a dual-channel leak tester is shown in the preferred embodiment, if it is not contemplated to test parts wherein two chambers must be pressurized, a single-channel leak tester could be used. Or, for increased speed, two single-channel leak testers could be utilized instead.

In station seven it is desired to prepare the part for a test of leakage between two cavities. Therefore, cavity one is vented to atmosphere in a manner hereinafter described, and cavity two is balanced.

In station eight, cavity two is leak tested by the provision of an additional single-channel leak test means, and in station nine, with the leak test ended, the part is unclamped and a grading mark is applied.

In station ten the part is unloaded either manually or, as in the preferred embodiment, by means of a robot.

The unique flexibility of the present system is achieved by using dedicated part holding means, such as pallets 70, which can be quickly loaded on and off the means of providing movement between stations, such as rotary index table 69, depending on the part to be tested. The pallets and the means of on-loading and offloading the pallets onto the index table 69 are shown in FIGS. 6–9.

Referring to FIG. 8, the pallet 70 is removably connected to the rotary index table 69 by the pins 67 passing through corresponding holes 67A in the pallet 70. For illustrative purposes, a leak test will be performed on the part 105 to be mounted in the pallet 70.

Means to perform the desired operations on the part 105, in this case clamping, sealing and then leak testing, are supplied by various clamp and/or seal means. A first clamp and seal means 90 is connected by a suitable conduit 90A to the male portion of the clamp and seal quick disconnect 92A which forms a portion of the means to connect to the means to perform the desired operations. In this case, since the clamps are pneumatic in nature, the conduits and the quick disconnects would be suitable for conducting air pressure to the first clamp and seal means 90. However, because of the flexibility of the present system, some of the quick disconnects may be air, while some may be hydraulic and/or some may be electrical, or any combination of these, depending on whether a testing operation, a manufacturing operation, or a gauging operation was to take place.

A second clamp and seal means 91 is connected by means of a suitable conduit to the second clamp and seal means quick disconnect 100A, while a clamp means 97 is connected, via suitable conduits, to the male portion of the clamp means quick disconnect 96A.

First and second clamp and seal means 90 and 91 are used to seal the air cavity 114. Seal means 98, in combination with clamp and seal means 90, is used to seal the water cavity 120. Seal means 98 is connected to the male portion of second clamp and seal means quick disconnect 100A along with said second clamp and seal means. In operation, the programmable controller 60 will, upon receiving a signal from the pushbuttons 77 in a manner to be described, first operate the first clamp and seal means 90, the clamp means 97, and then simultaneously operate the second clamp and seal means 91 and the seal means 98.

Mounted above the pallet 70 on the quick disconnect holder 87 are the female portions of the disconnects just described 92B, 96B and 100B respectively, connected by suitable conduits to supply pressure to the devices just described. It is to be noted that while the operations on the pallet 70 ultimately will require five disconnects, the reciprocating disconnect holder 87 for a particular station holds only those number of disconnects, in this instance three, which are needed for the operation taking place at the particular station. For clarity, labeling of the conduits has been omitted in the foregoing description.

Any combination of pneumatic, hydraulic, electrical or other disconnects may be used at any particular test station. The quick disconnect holder 87 may be reciprocatively operated by mechanical, hydraulic, pneumatic or electrical means well known in the art.

The bottom of the pallet 70A slides on an ultrahigh molecular weight polymer rails 59, such as that available from Almac Plastics of Warren, Mich., which is extremely slippery and reduces friction between the pallet and the rails to a minimum. It also is desirable to impregnate the bottom 70A of the pallet 70 with black teflon for the purposes of reducing friction.

The polymer rails 59 are mounted by any suitable means to a stationary lower platform 58 below the rotary index table 69. In addition to the uniqueness provided to the present system by the dedicated pallets 70, having all the means which will clamp, test, guage, or providing manufacturing operations mounted on the pallet, means to transfer said part holding means to offload one entire set of pallets off the rotary index table 69 and on-load a further new set of pallets onto the index table with the space of several minutes are provided.

Referring to FIGS. 6 and 7, a storage means 50 is provided which may be used to store a plurality of empty pallets when not in use. Including a plurality of vertical members 50A and horizontal members 50B, the storage means, generally designated by the numeral 50, may be provided with wheels 51 and brake 52, and provide several storage levels, each having a plurality of rails 59 of the ultrahigh molecular weight polymer previously described in connection with the stationary lower platform 58. With the bottoms 70A of the pallets 70 impregnated, and sliding on the polymer rails 59, lateral movement of the pallet by the operator is easily initiated. In order to move the pallets 70 from the storage means 50 to the rotary index table 69, a transfer means generally designated by the numeral 61 is provided.

With the storage means 50 held adjacent the part holder transfer means 61 by the attaching means, generally designated by the numeral 57, the pallet 70 is first slid laterally off the upper level of the storage means 50 onto the polymer rails 59 fixedly mounted to the vertical lift table 62 which can be reciprocated in a vertical direction by means well known in the art. The vertical lift table 62, in turn, can be laterally reciprocated by virtue of its being mounted on the reciprocating platform 65 movable on the rails 65A by means well known in the art.

With the reciprocating platform 65 moved as far outwardly of the rotary index table 69 as possible, and the vertical lift table placed at its maximum height, the operator slides a pallet 70 onto the rails 59. The vertical lift platform 62 is lowered to the height of a guide 52 affixed to the stationary lower platform 58 adjacent one of the stations. The reciprocating platform 65 is then moved laterally until the edge of the pallet 70 fits into the guide 52, and the vertical lift platform 62 is lowered until the pins 67 fit into the complimentary holes 67A in the pallet 70. By continually unloading all three levels of the storage means 50 in this manner, a new series of pallets can be loaded onto the rotary index table 69 in a very short period of time. It should be understood that the storage means 50, although illustrated as being movable and having three levels, can be of any practical configuration.

If one series of parts were already being tested on our improved machine, the reverse of this operation obviously would take place first to offload the old pallets onto a storage means 50, such storage means being removed, and a new storage means full of empty pallets for the next part to be tested would be on-loaded into the system by the means just described. Thus, there is provided a dedicated part holding means, such as pallet 70, having all the operating means needed to perform whatever it is desired to do to the part mounted on said pallet, which, by means of the transfer and storage means, can be quickly on-loaded and offloaded onto our flexible system, such that a wide variety of parts may be operated on by the use of a single machine with a minimum investment in additional pallets, rather than a tremendous investment in additional dedicated test stands.

Figure 9:
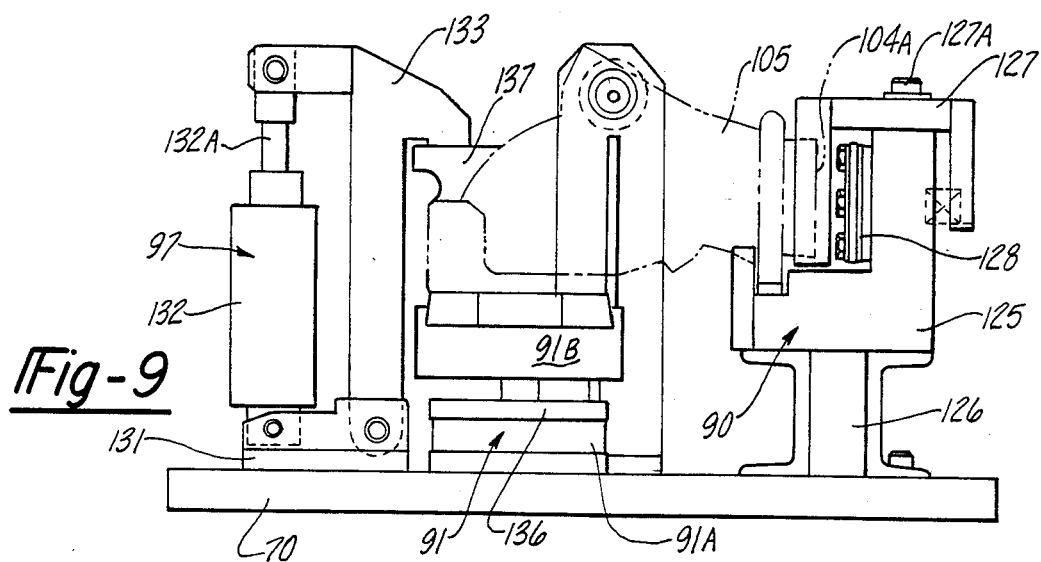
FIG. 9 is an elevational view of the pallet shown in FIG. 8.
Figure 10:
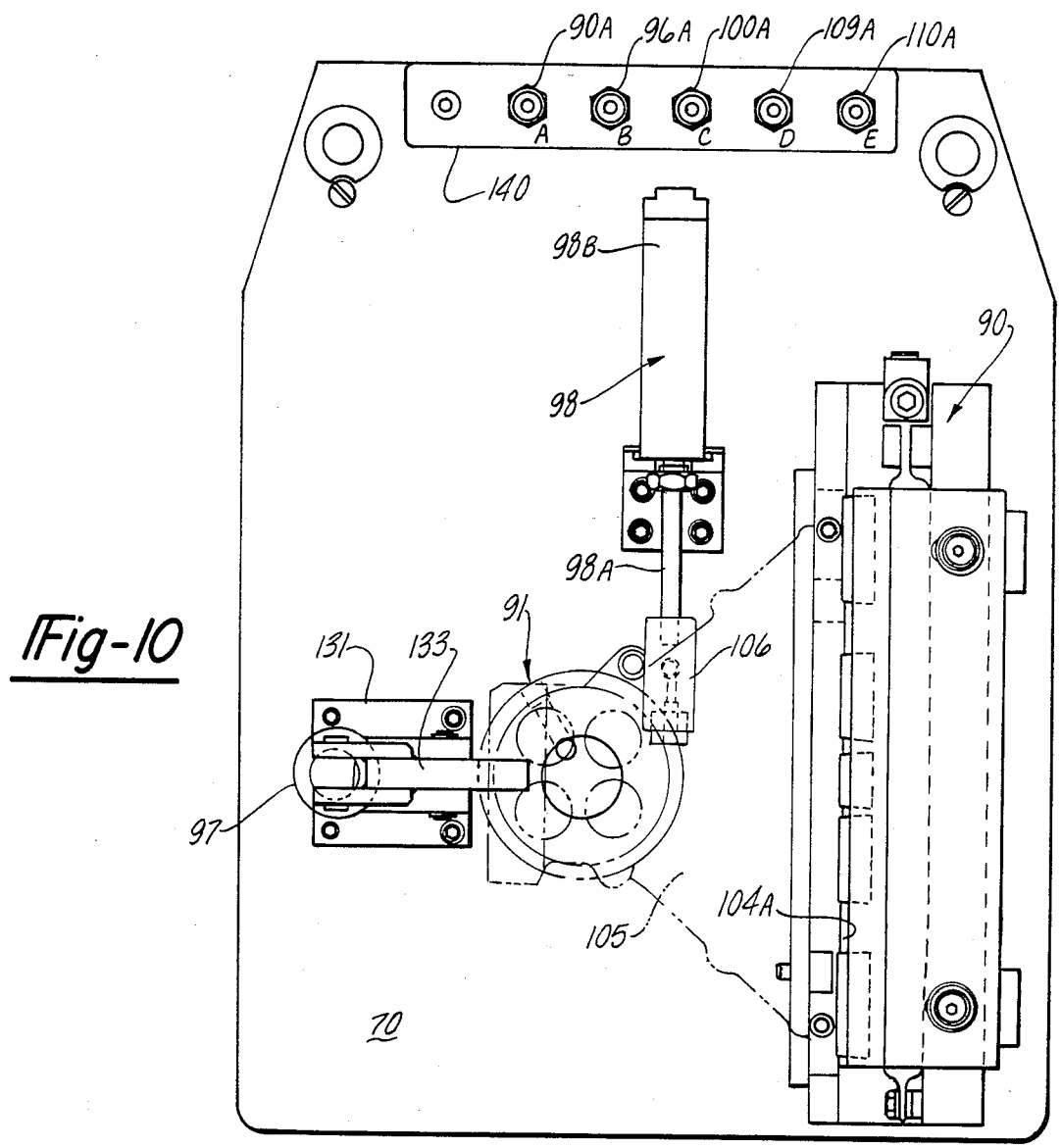
FIG. 10 is a plan view of the pallet shown in FIG. 8.

Enlarged views of the part holding means, showing the means to clamp and seal the part and connect it to the rest of the system when needed, are provided in FIGS. 9 and 10. The test part 105 has a manifold mounting surface 104A and carburetor manifold mounting surface 104B which must be sealed before pressure can be introduced into the interior of the test part.

Referring now to FIGS. 8, 9 and 10, the first clamp and seal means, generally designated by the numeral 90, has a base 125 mounted to a channel 126 which, in turn, is fastened to the pallet 70. Restrained for lateral movement on the base 125 is a movable member 127 having the necessary seals 129 mounted thereon to seal the manifold mounting surface 104A of the test part 105. Mounted on the opposite side of the pallet from the first clamp and seal means 90 is clamp means 97.

The second clamp and seal means 91 has a base portion 91A and an extendable sealing portion 91B having a gasket 136 mounted thereon.

The clamp means, generally designated by the numeral 97, consists of a base member 131 fixedly mounted to the pallet 70. A cylinder 132 is pivotally mounted to the base member 131. Pivotally mounted between the shaft of the cylinder 132 and the base member 131 is a reciprocating clamping member 133.

The seal means 98 is in the form of an air cylinder 98B having a shaft 98A with a sealing head 106.

To clamp and seal the part in position, air is first supplied through quick disconnects to the first clamp and seal means 90 causing the movable member 127 to move to the left against the manifold mounting surface 104A by virtue of the expansion of the inflatable bladder 128. Next, air is supplied to the cylinder 132 of the clamp means 97, causing the shaft 132A to extend and forcing the reciprocating clamping member 133, by virtue of its mounting between the shaft 132A and the base member 131, to rotate slightly in the clockwise direction bringing pressure to bear on the extension 137 of the manifold, forcing it in a downward position.

After this occurs, air is simultaneously supplied to the second clamp and seal means 91 causing it to extend and seal the carburetor manifold mounting surface 104B, and to seal means 98, to seal water cavity 120.

Thus, the means to hold the part to the part holding means can clamp and seal the test part 105 in place for performance of whatever operation is to take place on the test part. In this case, a pressurized air leak test.

For clarity and ease of understanding, some of the conduits connecting the clamp and seal means 90, the second clamp and seal means 91, the clamp means 97, and the seal means 98 to quick disconnects 92A, 96A and 100A are not shown. These connections will be described in detail hereafter.

In actual operation, referring to FIGS. 3-7, the operator, prior to loading any parts in any of the test stands, has positioned a storage means 50 adjacent the work transfer means, such as the rotary index table generally designated by the numeral 69, and has manually unloaded the pallets adapted to test the previous part from the work transfer means using the transfer means 61, has removed this storage means 50 and has moved in a new storage means filled with a plurality of identical pallets 70, which may be the same as previously described, which, when loaded with parts, will move through the ten test stations. For ease of illustration, the movement of one of these pallets, and its related part, will be traced through all ten of the test stations.

It should be understood that the overall operation of the present system is under the control of a programmable controller 60 which, acting in response to signals received from the operator activating pushbuttons 77, performs the operations to be described. The programming of the controller is well within the skill of the art and is not described herein in detail. Of course, if a computer or other means of operation of the system is desired, these are within the scope of the present invention.

Before loading the first part, the operator utilizing the part indentication thumbwheel switch 71, which may be such as the two-wheel switch Part No. A7PH-206, manufactured by Omron Electronics, Inc. of Schaumburg, Ill., enters into the programmable controller 60 the style of the part to be tested. Contemporaneously with making this entry, the operator, by means of the computer 73, which may such as the Kaypro 2, Model No. 72716, manufactured by Micro Pro International Corporation, or its equivalent, enters into the dual-channel leak test means 74 and the single-channel leak test means 76 respectively, the test parameters for the particular part being tested. It should be understood that directions on how to program these leak testers are supplied therewith, and the utilization of these directions with the computer 73 is well within the skill of the art and need not be described in detail herein.

After entering the style number of the part and up loading the necessary computer programs to operate the leak test means, the operator manually loads the first part to be tested onto the pallet 70 while it is in station one. In the illustration used herein, the test part (FIG. 5) is an engine manifold having a carburetor manifold mounting surface 104B and a manifold mounting surface 104A. A plurality of air passages 114 in the manifold form the first cavity 115 which must be sealed and tested, while the water cavity 120 is the second cavity to be tested. It can be easily understood that different styles of manifolds or different types of parts may have vastly different sealing requirements, all of which are easily accommodated by our dedicated pallet 70. The operator then utilizes the pushbuttons 77, after receiving the ready to index signal from light 143, to cause the index table 69 to index for 36°, bringing the now loaded pallet 70 into test station two. Means to check for a part being present are then activated.

At this time the programmable controller 60 which may be such as the Allen Bradley No. PLC 2/30, manufactured by Allen-Bradley, Systems Division, of Highland Heights, Ohio, sends a signal to the extend probe air valve 79 which is connected to the controller 60 by way of line 80. The controller sends a signal to admit air pressure through the valve 79 into the probe cylinder 81. This extends the probe 82 mounted on the end of the air cylinder shaft 83 in an attempt to determine if there is a part on the pallet 70 when it arrives at test station two.

If the probe is extended to its full length, the extension 86 mounted on the opposite end of the air cylinder shaft 83 from the probe 82 will strike the probe extended limit switch 84, telling the programmable controller 60 that there is no part present in test station two and thus, signaling the controller to not test this pallet in any other station.

If the probe 82 is unable to extend its full distance, such as when it hits a part, the cylinder will reverse causing the extension 86 to come in contact with the probe returned limit switch 85 confirming that there is a part present and informing the programmable controller 60 to continue with the test.

At this point, the quick disconnect cylinder 88 is supplied with air by an extend cylinder air valve 103 which is connected to an air source and operated by a signal supplied by the programmable controller 60 through means connecting it therewith. The disconnect cylinder 88 operates until the quick disconnect holder 87 contacts the extend limit switch 141 at which time the male portions of the quick disconnects 92A, 96A and 100A are engaged, and the clamp and seal operation previously described takes place.

After the clamp and seal operation has taken place, the programmable controller 60 operates to reverse the operation of the quick disconnect cylinder 88 by retracting the same, thus causing the quick disconnect holder 87 to retract until retract limit switch 142 is contacted, causing the male and female portions of the clamp and seal means quick disconnect, the clamp means quick disconnect, and the second clamp and seal means disconnect, 92, 96 and 100 respectively, to separate.

Since no air pressure is lost when the disconnects 100, 96 and 92 separate, the part remains sealed and clamped in place on the pallet 70. The operator, when he completes loading station one, and when the ready to index light 143 illuminates, will push the pushbuttons 77 to cause the index table 69 to bring the pallet 70 into station three.

It should be understood that since a sequential series of steps are being described, an identical pallet 70 will be moving into station two to have the series of operations just described performed on it, while the series of steps to be described in station three is occurring. In the particular example being used, the operations in each test stand take place in three and three-quarter second intervals, and then are always followed by a one and one-quarter second indexing interval. Depending on the particular part being tested, of course, these parameters may change, and are easily programmed into the test system for each different part by means of the programmable controller 60.

Obviously, as will be described later, when the sequential steps have been completed and a part is unloaded in station ten, and the pallet is then indexed to station one, each time an empty pallet comes into station one, a part will manually loaded thereon by the operator to keep the pallets moving into the subsequent test stations loaded with parts to be tested.

Since the clamp and seal quick disconnect 92, the clamp means quick disconnect 96, and the second clamp and seal means quick disconnect 100 are not used in stations three through nine, they will not be further described until the pallet arrives in station ten. Instead, the pallet 70 with the test part 105 is now moving into a sequence of test stations where the part is filled and balanced. Thus, fill means and balance means must now be supplied and connected to the rest of the test system.

The seal means 98 used to seal the part in station two, and the second clamp and seal means 91, by virtue of their constructions, are also used as a means to introduce air into the interior of the test part 105, thus, in effect, connecting the test part to the remainder of the system. The sealing head 106 mounted on the shaft 107 of the seal means 98 can introduce air into the water cavity 120 of test part 105 by virtue of a conduit communicating with the interior of the test part and being connected to the male portion of the first test quick disconnect 109A. Likewise, a conduit communicating with the interior of second clamp and seal means 91 is connected to second test disconnect 110. They are again mounted to the quick disconnect holder 87 which is extended and retracted by the quick disconnect cylinder 88 operated by the extend cylinder air valve 103 in the manner previously described.

In station three, a prefilling operation of the part with air at the test pressure is to take place, and this is under the control of the programmable controller 60. Assuming that the quick disconnect holder 87 has been extended by the quick disconnect cylinder 88 so that the first test quick disconnect 109 and the second test quick disconnect 110 are engaged, air entering the pressure regulator 112 is allowed by the balance valve 113, upon the receipt of a signal from the programmable controller 60, to enter the two cavities of the test part 105 through the sealing head 106 on the seal means 98 and through the interior of the second clamp and seal means 91. A timed fill takes place depending upon the test part, at which time both cavities of the part are filled to the pressure set on the regulator 112.

At the conclusion of the fill time, the programmable controller 60 signals the quick disconnect cylinder 88 to retract the quick disconnect holder 87, thereby disconnecting the first test quick disconnect 109 and second test quick disconnect 110. At this time the operator signals the rotary index table 69 to index an additional 36°, thereby bringing the pallet 70 containing the test part 105 into station four.

Station four is essentially a fill and balance station which adds an additional five seconds of balance time to the leak test, and allows the pressure in the part to stabilize and compensate for the affects of adiabatic heating or cooling of the part as air is introduced therein, the effects of the ambient temperature to stabilize, and any effects of their turbulence or part design to be taken into account.

When the pallet 70 enters station four, the first test quick disconnect 109 and the second test quick disconnect 110 are engaged as previously described by the operation of the quick disconnect cylinder 88 extending the quick disconnect holder 87 by virtue of the signal supplied by the programmable controller 60 to the extend cylinder air valve 103 until it hits extend limit switch 141. If any air has been lost by the test part 105 by virtue of the previously mentioned considerations, additional air will be introduced into the air cavity 114 or the water cavity 120 of the test part 105 as previously described up to the pressure set by the pressure regulator 112 being transmitted through the balance valve 113.

After the balance interval, a ready signal will again be sent to the process controller 60. After ready signals are received from all the other stations, the process controller will illuminate the ready to index light 143. When the operator is ready he will depress pushbuttons 77 to index the table 69 which will again take place as previously described after the quick disconnects are retracted as before. The pallet 70 now moves into station five, the first test quick disconnect 109 and the second test quick disconnect 110 are brought into operation by the extension of the quick disconnect holder 87 and pressure can then be transmitted to air cavity 114 or water cavity 120 of test part 105 in the manner previously described.

Station five is again a fill and balance station, and if any pressure has been lost from either air cavity 114 or cavity 120 of the test part, the cavity will be brought up to the pressure being transmitted by the pressure regulator 112. At the end of the balance time, the first test quick disconnect and the second test quick disconnect, 109 and 110 respectively, will again be retracted by the quick disconnect holder 87 until it contacts retract limit switch 142 and the pallet 70 will be indexed into station six as previously described.

At this point, it is important to note that in preparation for the leak test of test part 105, the part has been balancing itself and supplying itself with additional air as needed up to the setting of the pressure regulator 112 in three separate test stations for a total of fifteen seconds, even though the production rate of the stand produces one tested part every five seconds. Thus, splitting up the leak test to take place over multiple test stations is a major advantage of the present invention and eliminates the need for lower production rates, i.e. one every fifteen seconds in the present example, which will require three times as many test stations if the dedicated type of prior art leak test station were used. Thus, the present invention provides improved production rates at much less expense than the prior art devices.

At station six the actual leak test begins. In this instance, when the quick disconnect holder 87 is lowered until it contacts extend limit switch 141 by the quick disconnect cylinder 88, as before, the male portion 109A of the first test quick disconnect mates with the female portion 109B, and the male portion 110A of the second test quick disconnect mates with the female portion thereof 110B. In this case, however, the female portions of the first test quick disconnect and the second test quick disconnect are connected to dual-channel leak test means 74. Thus, air cavity 114 of test part 105 communicates through first test quick disconnect 109 with channel A of the dual-channel leak test means 74 and water cavity 120 communicates with channel B of the dual-channel leak test means 74.

The dual-channel leak test means is started by the programmable controller 60. As previously discussed, the computer 73 has up loaded the proper test programs into the leak test means for the part being tested, and the operator has entered in the thumbwheel switch 71 a code number identifying the style number of the part being tested.

It should be understood that many leak test means can be used in the present invention. In the preferred embodiment, the Uson Series 100 leak tester, manufactured by Uson Corporation of Houston, Tex., is utilized. Such leak test machines come with detailed instructions for their wiring and other connections, and it is well within the ability of one skilled in the art, having the instructions furnished by the manufacturer of the leak test system, the programmable controller, and the computer, to connect them as shown in the diagram in FIG. 1.

Regardless of the manufacture of the leak test system, many types of indications may be given thereby and displayed at various parts of the system as desired. These can be such as indicated by the test light 116 showing that a test is taking place, an accept light 117 which is illuminated at the conclusion of the test if the part is acceptable, a fine leak light 118A and a coarse or large leak light 118B which are illuminated at the conclusion of the test depending on how bad the part is.

As in any leak test system, the particular parameter which will indicate an acceptable or reject part must be supplied by the manufacturer of the part. For a typical part being tested, the following is an exemplary table of such values.

| Leak Rate | Leak Range | Coding Applied |
| --- | --- | --- |
| <30 ccm (air) | accept | blue |
| <12 ccm (water) | accept | blue |
| (water cavity) 12 to 120 ccm | reject | yellow |
| (air cavity) 30 to 120 ccm | reject | yellow |
| >120 ccm | reject (between cavities) | orange |
| >120 ccm (external) | reject (large or gross) | red |

In this particular example, the part to be tested has two cavities, air cavity 114 and water cavity 120. The leak test which had just taken place, which has pressurized both cavities, was a testing of the leakage from those cavities to atmosphere. However, under certain conditions it is desirable to test leakage between these two cavities.

In this case, it is necessary to vent one of the cavities to atmosphere and rebalance the other cavity. This is done by yet another way of connecting the female portions of the first test quick disconnect 109B and the second test quick disconnect 110B. This is done after test part 105 moves into station seven. In this case, the male portion 109A and the female portion 109B of the first test quick disconnect are connected through balance valve 113 and pressure regulator 112 to a source of air, while the second test disconnect consisting of male portion 110A and female portion 110B are connected to atmosphere causing a venting of the water cavity 120 of the test part 105 to atmosphere, while the air cavity 114 is filled to the pressure provided by the regulator in preparation for the next leak test.

The actual test takes place when the pallet 70 moves into station eight, and the first test quick disconnect and the second test quick disconnect are again activated as previously described. In this case, the second test quick disconnect still provides communication with atmosphere, but because the female portion 109B of the first test quick disconnect is now connected to a single-stage leak test means 76, a leak test of cavity one can now take place. It should, of course, be understood that depending on the particular part, many additional combinations of leak test could be taken depending upon a particular part being tested.

The single-stage test means 76, which may be such as Uson Series 100 single-channel leak tester, manufactured by the Uson corporation of Houston, Tex., again has a test light 116 thereon which is illuminated any time a test takes place, an accept light 117 which is illuminated at the conclusion of the test if the part is good, and a series of reject lights 118A-B which are illuminated at the end of the test if the part is to be rejected.

The single-stage leak test means 76 is again operated by the programmable controller 60, and as before, before beginning the leak test of the part 105, the operator, through the use of the computer 73, has up loaded the necessary test parameters into the test means, and the operator has entered the style of the part on the thumbwheel switch 71 connected to the programmable controller 60.

As before, the manufacturers of the computer, the leak test means and the programmable controllers supply instructions for their connection and operation in such detail that, given the diagrammatic view of FIG. 1, the connection of these devices to perform the operations just described is well within the capabilities of one skilled in the art and is not described herein in detail.

When the leak test of the air cavity and the water cavity to atmosphere, and the air cavity to the water cavity are completed, the first test quick disconnect and the second test quick disconnect are disengaged as previously described, and the rotary index table will be indexed an additional 36° by the operator, bringing pallet 70 into station nine, where it is desired to unclamp the part and apply a grade mark to indicate the extent of the leak present, if any, as previously described. In this case, the first test quick disconnect 109 and the second test quick disconnect 110 are no longer utilized, but the clamp and seal means quick disconnect 92, the clamp means quick disconnect 96 and the second clamp and seal means quick disconnect 100 are again activated as previously described in connection with station two. In this case, they are simply vented to atmosphere so that when a connection is made the first clamp and seal means 90, clamp means 97, and second clamp and seal means 91 are retracted, and the part is free to be removed.

However, as previously described, if a leak was present a first part marker 121, a second part marker 122 and a third part marker 123 are supplied and are operated by the programmable controller 60.

The first part marker 121 will spray a small color code on the part if there is a leak from air cavity 115 to atmosphere. The second part marker 122 will apply a small coding dot, preferably of a different color, if there is a leak from water cavity 120 to atmosphere, while the third part marker 123 will apply a color coded dot if there is a leak between the two cavities.

After the color codings are applied, if needed, the rotary index table 69 is rotated another 36° by the operator into station ten, which is an unloading station. If desired, the part may be manually unloaded from station ten, and then the rotary index table 69 will be indexed at the appropriate time into station one, where the operator will place a new test part 105 on the part holding means in the form of a pallet 70 so the test cycle may begin anew.

Figure 11:
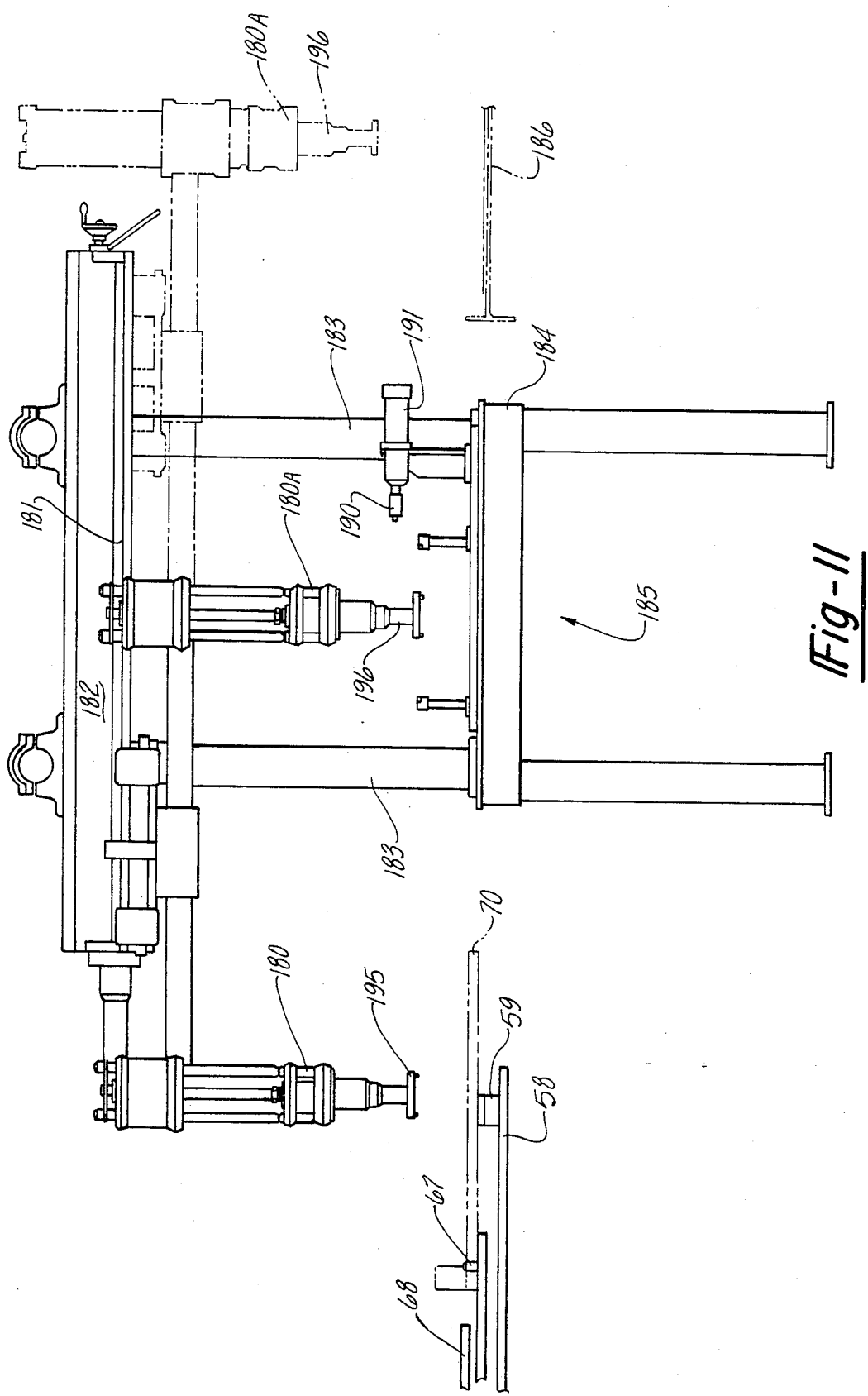
FIG. 11 is an elevational view of the robotic unloading station which unloads tested parts from station ten of the apparatus shown in FIG. 1.

In the preferred embodiment, however, realizing the necessity for greater and greater production, a robot unloading mechanism, such as shown in FIG. 11, is used. This may be such as a standard Aluminum Super Shuttle manufactured by I.S.I. Manufacturing Co., Inc. of Fraser, Mich. It should be understood that many such units are suitable, and the equivalent of the unit illustrated could be just as easily used in the present construction.

In this case, a pair of actuating units (180, 180A) are mounted for reciprocative movement to a track 181 mounted on the shuttle body 182. The shuttle body 182 is mounted to suitable supports 183 which are, in turn, mounted to a base unit 184, which also forms part of the mechanical marking station generally designated by the numeral 185.

Adjacent the base unit 184 is an unloading platform 186. In operation, the shuttle unit is operated by the programmable controller 60, and when an output is sent to the unit the first actuating unit 180 descends, clamps and lifts the test part off the pallet 70. Assuming that the shuttle has just begun operation, there is no part in the mechanical marking station 185. The actuating units (180, 180A) then reciprocate laterally of the base unit 184 until the first actuating uit 180 is directly over the base 184, and the second actuating unit 180A is over the unloading platform 186.

By means well known in the art, a part is deposited in the mechanical marking station by the first gripper unit 195 associated with the first actuating unit 180. The first and second actuating units (180, 180A) then reciprocate in the opposite direction. When another part is in station ten ready to be loaded, there is in this case a part in the mechanical marking station. While waiting for another part to come into the unloading station, a mechanical marking is applied to all parts, whether or not they have passed the leak test. A stamping head 190 operated by cylinder 191 is extended upon receiving a signal from the programmable controller 60 to physically mark the part. This all takes place within the same five-second cycle time of the rotary index table. Thus, when the next part is ready to be unloaded, the second actuating unit 180A picks up the part in the mechanical marking station 185 via the second gripper unit 196, while the first actuating unit 180 picks up the part in the unloading station via the first gripper unit 195.

The units 180 and 180A then reciprocate laterally until the first actuating unit 180 is able to deposit a new part in the mechanical marking station 185, and the second actuating unit 180A can deposit the marked part on the unloading station, thus, providing a completely automatic way of unloading our flexible industrial system.

If needed to facilitate receiving the test parts, additional fixturing over that shown may be utilized in the mechanical marking station 184 and/or the unloading platform 186. It is also anticipated that the gripper units (195, 196) may have to be changed when a change in test parts occurs.

Figure 12:
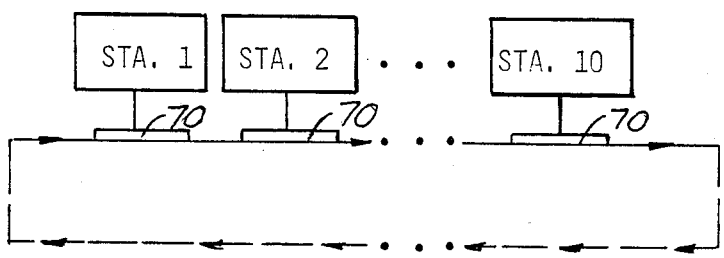
FIG. 12 is a diagrammatic view showing how the flexible industrial system of FIG. 1 may be laid out in a linear manner.
Figure 4:
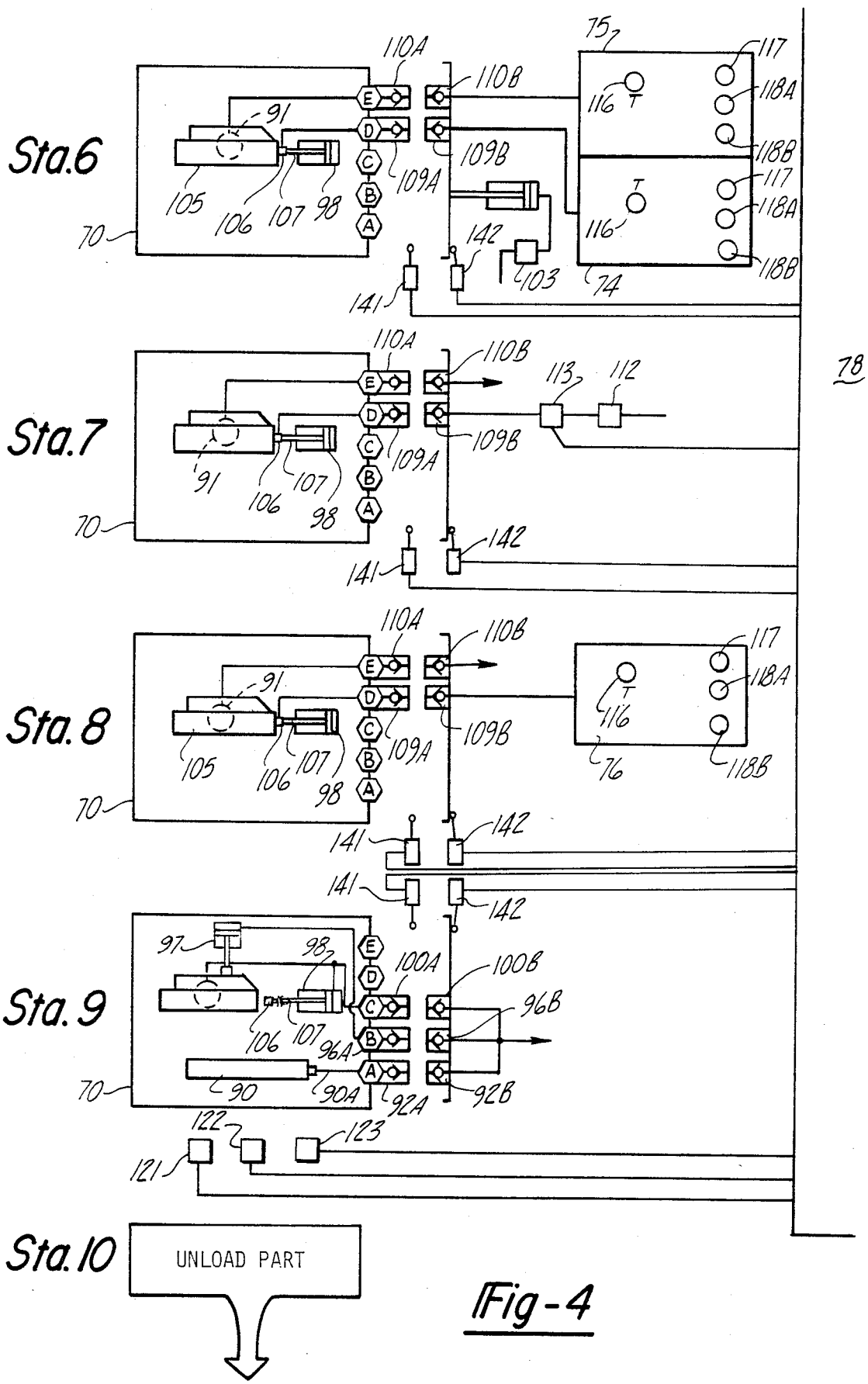
FIG. 4 is a diagrammatic view showing in greater detail stations six through ten of the test system shown in FIG. 1.

While the preferred embodiment disclosed shows the use of a rotary index table for moving between the operative stations of our flexible industrial system, it can be easily seen that the stations could be arranged in a linear manner such as shown in FIG. 12, which is a diagrammatic view of such a system. In this case, the part holding means in the form of pallets 70 move along seriatim in front of a test system with the same cycle time the rotary index system has, and then are returned under the test system by means well known in the art to a manual loading station, such as station one in the rotary system. All of the test stations and the operations which take place therein would be identical to the rotary system and, therefore, are not described in detail.

Thus, by combining the features of a means of transfer of work between stations, a dedicated means for holding parts, a means to transfer such part holding means on and off the transfer means in a short period of time and a storage means for such part holding means, we have solved the problem long standing in the art of how to provide a system which can perform a large number of different operations on a wide variety of parts in an efficient and economical manner.

We claim:

1. A flexible industrial system having a plurality of stations for performing operation on parts, including, in combination:
   (a) a means to operate said system;
   (b) a means of providing movement between said stations, said means to provide movement connected to said means to operate;
   (c) part holding means easily connectible to said means for providing movement;
   (d) means to perform desired operations on said parts mounted on said part holding means and including means to clamp and/or seal a part on said part holding means, wherein said means to clamp and seal include
      (1) a first clamp and seal means fixedly mounted to said palate and connected to said means to connect;
      (2) a second clamp and seal means fixedly mounted to said palate and connected to said means to connect;
      (3) a clamp means fixedly mounted to said palate and connected to said means to connect; and
      (4) seal means mounted to said palate and connected to said means to connect,
   (e) means to connect to said means to perform said desired operations, said means to connect connected to said means to operate;
   (f) storage means for said part holding means when not in use;
   (g) means to transfer said part holding means between said storage means and said means for providing movement between said stations, said means to transfer connected to said means to operate,
   (h) leak test means connected to said means to operate, and to the interior of said part through said means to connect; and
   (i) means mounted to said part holding means to supply air to the parts to be tested, said means to supply connected to said means to connect.

2. The system defined in claim 1, wherein said means to supply air to said test part include:
   (a) a sealing head having a passageway communicating with the interior of a part to be sealed by said seal means mounted to said seal means;
   (b) a means to introduce air into the interior of said second clamp and seal means; and
   (c) a conduit connecting each of said sealing head passageway and said means to supply air to the interior of said second clamp and seal means to connectors forming a part of said means to connect.

3. The system defined in claim 2, and including means to fill and balance a part with air.

4. The device defined in claim 3, wherein said fill and balance means include:
   (a) at least one pressure regulator in one of said test stations connected to a source of air; and
   (b) a balance valve connected to said regulator and to said means to supply through said means to connect, said balance valve also being connected to said programmable controller.

5. The system defined in claim 4, wherein said means to fill and balance are in two of said stations.

6. The device defined in claim 5, wherein said means to fill and balance are in three of said test stations.

7. The system defined in claim 4, wherein said leak test means include:
   (a) a dual-channel leak test means connectable to said part through said means to connect in at least one of said test stations and to said programmable controller; and
   (b) a computer connected to said programmable controller and said leak test means.

8. The system defined in claim 7, and including an additional single-channel leak test means connectable to said part through said means to connect, said single-channel leak test means being connected to said computer and to said programmable controller.

9. The system defined in claim 8, and including a thumbwheel switch connected to said programmable controller on which the operator may enter a part style number.

10. The system defined in claim 9, wherein said single-channel leak test means and each of said dual-channel leak test means each include:
    (a) a test in progress light;
    (b) an accept light;
    (c) a fine leak reject light; and
    (d) a coarse and large leak reject light.

11. The system defined in claim 10, wherein at least one of said stations include:
    (a) a first clamp and seal air valve connected to an air source by a suitable conduit and connected to said programmable controller, said first clamp and seal air valve also connected to said means to connect;
    (b) a second clamp and seal air valve connected to said means to connect, an air source and said process controller; and
    (c) a seal air valve connected to said means to connect, an air source, and said process controller.

12. The system defined in claim 11, wherein said means to connect include:
    (a) a quick disconnect holder;
    (b) a female portion of a first clamp and seal quick disconnect mounted to said quick disconnect holder and connected to said first clamp and seal air valve;
    (c) a female portion of a second clamp and seal quick disconnect mounted to said quick disconnect holder and connected to said second clamp and seal air valve; and
    (d) a female portion of a seal quick disconnect mounted to said quick disconnect holder and connected to said seal air valve.

13. The system defined in claim 12, wherein said means to connect further include:
    (a) a quick disconnect cylinder connected to said quick disconnect holder for reciprocating movement thereof; and
    (b) a quick disconnect air valve connected to said quick disconnect cylinder, a source of air, and said programmable controller.

14. The system defined in claim 13, wherein said means to connect further include an extend limit switch mounted in each station to be operated upon by said quick disconnect holder when the same is fully extended, thereby connecting said male and female portions of said quick disconnects, said extend limit switch connected to said programmable controller.

15. The system defined in claim 14, wherein said means to connect include a retract limit switch to be operated by said quick disconnect holder when the same is fully retracted, thus having separated said quick disconnects, said retract limit switch connected to said programmable controller.

16. The system defined in claim 15, wherein said means to provide movement between said stations include:
(a) at least one manual pushbutton connected to said programmable controller to indicate when said means to provide movement are to be activated; and
(b) a ready to index light connected to said programmable controller to indicate when a signal has been received from the retract limit switch mounted in each of said test stations.

17. The system defined in claim 16, and including means to automatically mark all rejected parts.

18. The system defined in claim 17, and including means to automatically unload test parts from said system.

* * * * *